United States Patent [19]

Shiozaki et al.

[11] 4,025,384
[45] May 24, 1977

[54] APPARATUS FOR SPLICING RUBBER COATED CORD FABRIC SECTIONS

[75] Inventors: Tadao Shiozaki; Daitetsu Meguro, both of Sayama, Japan

[73] Assignee: Bridgestone Tire Company Limited, Tokyo, Japan

[22] Filed: Dec. 22, 1975

[21] Appl. No.: 643,382

[30] Foreign Application Priority Data

Dec. 27, 1974 Japan .................. 50-3637

[52] U.S. Cl. .................. 156/502; 156/159; 156/304; 156/405; 156/517
[51] Int. Cl.² .................. B29H 9/04
[58] Field of Search .......... 156/133, 134, 157, 159, 156/250, 256, 260, 264, 266, 304, 405 R, 405 P, 502, 505, 516, 517

[56] References Cited

UNITED STATES PATENTS

| | | | |
|---|---|---|---|
| 3,027,289 | 3/1962 | Gitzinger | 156/134 |
| 3,130,100 | 4/1964 | Hasselquist | 156/157 |
| 3,192,094 | 6/1965 | Phillips et al. | 156/353 |
| 3,325,328 | 6/1967 | Henley | 156/502 |
| 3,433,690 | 3/1969 | Barns | 156/157 |
| 3,888,717 | 6/1975 | Koyama et al. | 156/159 |
| 3,898,116 | 8/1975 | Katagiri et al. | 156/134 |

*Primary Examiner*—Charles E. Van Horn
*Assistant Examiner*—John E. Kittle

[57] ABSTRACT

Herein disclosed is an apparatus for splicing rubber coated cord fabric sections in which a continuous rubber coated parallel cord fabric strip having side edges is obliquely severed into rhomboidal cord fabric sections and the side edges are thereafter overlapped and spliced in regular succession into a continuous bias cord fabric strip. The apparatus comprises a bias-cutter conveyor including a conveyor for transferring the continuous cord fabric and a bias-cutter mounted on the conveyor for obliquely severing the cord fabric strip into rhomboidal cord fabric sections; a positioning mechanism for positioning each of the severed cord fabric sections to have obliquely severed edges orientated to a conveyance direction thereof with the side edges obliquely arranged to the conveyance direction thereof; a transfer mechanism positioned forwardly of the positioning mechanism for suckingly holding and intermittently transferring each of the cord fabric sections; a conveyor mechanism positioned forwardly of the transfer mechanism to intermittently transfer the cord fabric sections received from the transfer mechanism; and a splicing mechanism positioned above the longitudinally intermediate portion of the conveyor mechanism for pulling back a previously advanced cord fabric section to overlap and splice the trailing edge of the previously advanced cord fabric section on the leading edge of a subsequently advanced cord fabric section.

7 Claims, 12 Drawing Figures

APPARATUS FOR SPLICING RUBBER COATED CORD FABRIC SECTIONS

This invention relates to an apparatus for splicing rubber coated cord fabric sections and, more particularly, to an apparatus in which a continuous rubber coated parallel cord fabric strip having both side edges is obliquely severed into rhomboidal cord fabric sections and the side edges are thereafter overlapped and spliced in regular succession into a continuous bias cord fabric strip.

Rubber coated cord fabrics are conventionally used in the manufacture of rubber tires to increase strength for a finished tire. To produced such rubber coated cord fabrics, it is common practice to coat parallelly woven cord fabric with rubber and thereafter to obliquely cut the rubber coated cord fabric into rhomboidal sections by a bias-cutter in a continuous manner. Then, the rhomboidal sections are overlapped and spliced at their edges to produce a continuous bias cord fabric strip. In general, it is well known as a splicing operation that an attendant operator overlaps and splices the bias-cut cord fabrics by his hands on a bias cutter conveyor. The operation was manually carried out resulting in extremely inefficiency and tediousness accompanied by hard labour. For these reasons, a variety of machines and methods have thus far been proposed but not been acceptable since the cord fabric sections are flexible and tacky as well as since the fabric cords are disarranged when they are exerted a small amount of tension. Moreover, it is also well known that a constant overlapping ratio widthwise of the cord fabric section is extremely important in the splicing operation to obtain excellent performance of a completed tire.

It is, therefore, an object of the present invention to eliminate such drawbacks inherent in the prior art and to provide an apparatus for uniformly overlapping and splicing the rubber coated cord fabric sections in an automated fashion which will provide production efficiency and contribute to elimination of the laborious and tedious operations which have thus far been necessitated.

In accordance with the present invention, there will be provided, to accomplish such an object, an apparatus for splicing rubber coated cord fabric sections in which a continuous rubber coated parallel cord fabric strip having side edges is obliquely severed into rhomboidal cord fabric sections and the side edges are therefore overlapped and spliced in regular succession into a continuous bias cord fabric strip, comprising; a bias-cutter conveyor including a conveyor for transferring the continuous cord fabric and a bias-cutter mounted on the conveyor for obliquely severing the cord fabric strip into rhomboidal cord fabric sections; a positioning mechanism for positioning each of the severed cord fabric sections to have obliquely severed edges orientated to a conveyance direction thereof with the side edges obliquely arranged to the conveyance direction thereof; a transfer mechanism positioned forwardly of the positioning mechanism for suckingly holding and intermittently transferring each of the cord fabric sections; a conveyor mechanism positioned forwardly of the transfer mechanism to intermittently transfer the cord fabric sections received from the transfer mechanism; and a splicing mechanism positioned above the longitudinally intermediate portion of the conveyor mechanism for pulling back a previously advanced cord fabric section to overlap and splice the trailing edge of the previously advanced cord fabric section on the leading edge of a subsequently advanced cord fabric section.

The features and advantages of the apparatus according to the present invention will become more apparent from the following description taken in conjunction with the accompanying drawings, in which.

Figure 1:
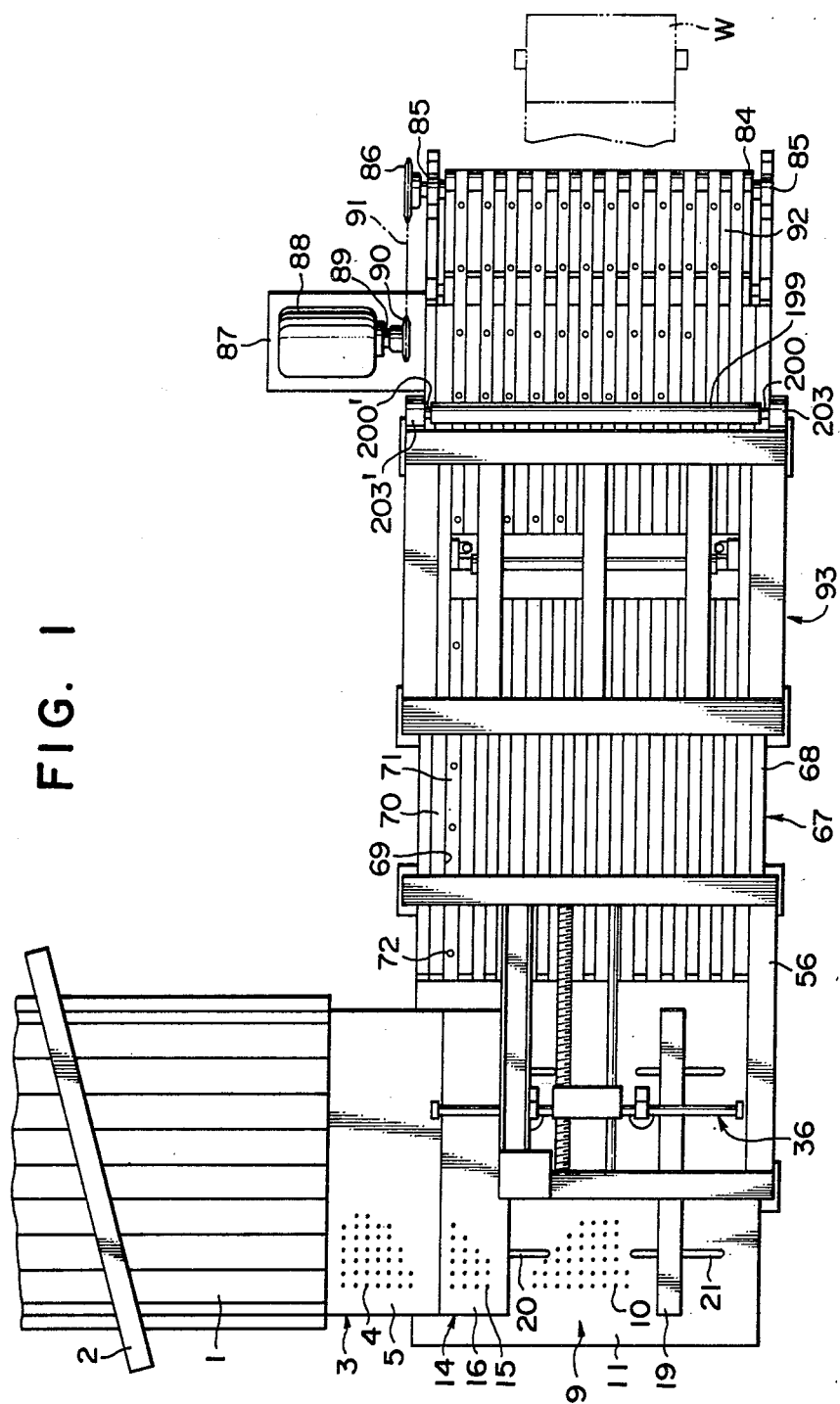
FIG. 1 is a diagrammatic plan view of an apparatus constructed in accordance with the present invention.
Figure 2:
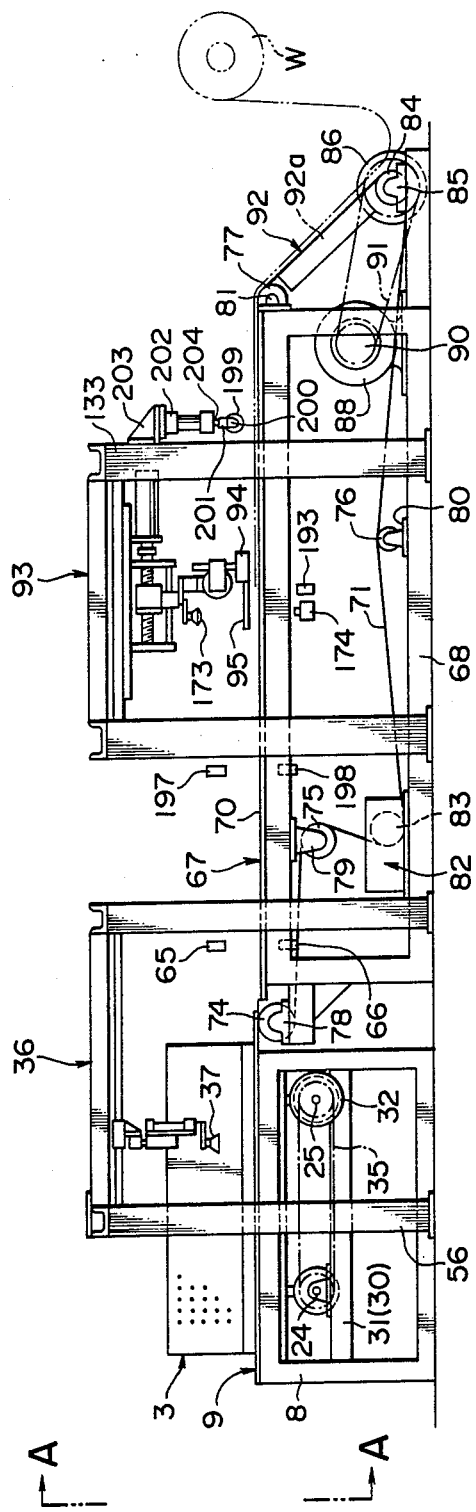
FIG. 2 is a diagrammatic front view of the apparatus illustrated in FIG. 1.

In FIGS. 1 and 2, there is shown a bias-cutter conveyor 1 which has a bias-cutter 2 thereon and at the forward end of which is provided a first slanted air ejecting chute 3 properly mounted on a frame 8. The air ejecting chute 3 includes an upper plate 5 having a number of air ejecting nozzles 4 and a box 7 forming together a compressed air chamber 6 as shown particularly in FIG. 4. An air ejecting table 9 is mounted horizontally on the upper portion of the frame 8 and includes an upper plate 11 having a number of air ejecting nozzles 10 and a box 13 to form together a compressed air chamber 12. A second air ejecting chute 14 having a slanted upper surface is mounted on the air table 9 to be slidable toward and away from the air ejecting chute 3. The chute 14 also includes an upper plate 16 having a number of air ejecting nozzles 15 and a box 18 to form together a compressed air chamber 17. A stop member 19 for stopping widthwise movement of a cord fabric is slidably adjusted on the air ejecting table 9 in parallel with and in spaced relation the air ejecting chute 14. Two pairs of parallel spaced guide grooves 20 and 21 are opposingly provided to vertically penetrate through the air ejecting table 9 in such a manner that air is prevented from leaking out of the compressed air chamber 12 of the air ejecting table 9. Dependent brackets 22 and 23 are securely connected to the lower portions of the air ejecting chute 14 and the stop member 19, respectively, so as to be in sliding engagement with the guide grooves 20 and 21 of the air ejecting table 9. The lower portions of the brackets 22 and 23 are adapted to be in threaded engagement with a pair of opposingly threaded rods 24 and 25. Two pairs of bearings 28 and 29 are securely mounted on a pair of horizontal beams 30 and 31 secured to the opposite inner sides of the frame 8 to rotatably support the threaded rods 24 and 25. A handle 32 is attached to the end of the threaded rod 25 (see FIG. 3) and serves to rotate the threaded rods 24 and 25 through sprocket wheels 33 and 34 secured to the end portions of the rods 24 and 25, respectively, and an endless chain 35 passed thereover so that the air ejecting chute 14 and the stop member 19 are moved toward and away from each other, adjusting a space therebetween. The threaded rod 25, the bearings 29 and the sprocket wheel 34 are positioned behind the threaded rod 24, the bearings 28 and the sprocket wheel 33, respectively, and thus not shown in FIG. 4 but indicated by parentheses.

Figure 3:
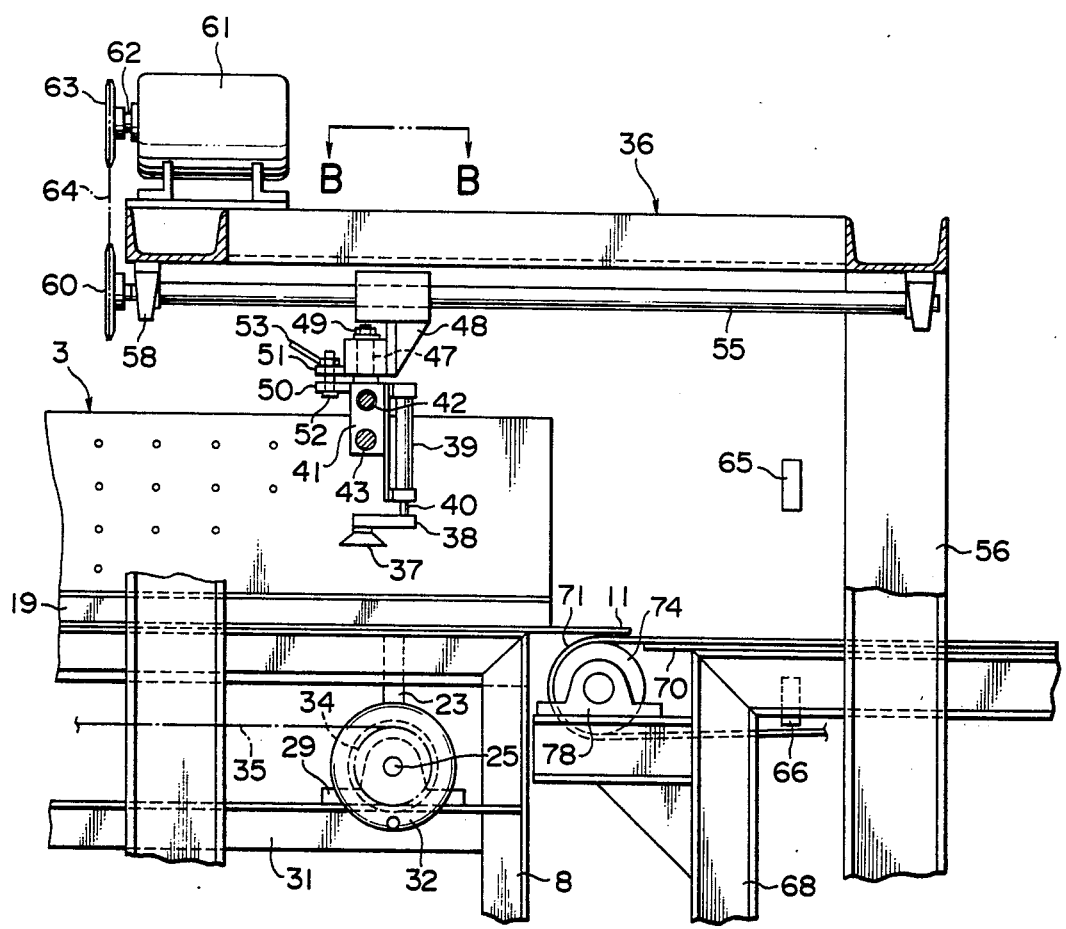
FIG. 3 is an enlarged front view, partly in section, of a transfer mechanism of the apparatus illustrated in FIGS. 1 and 2.
Figure 4:
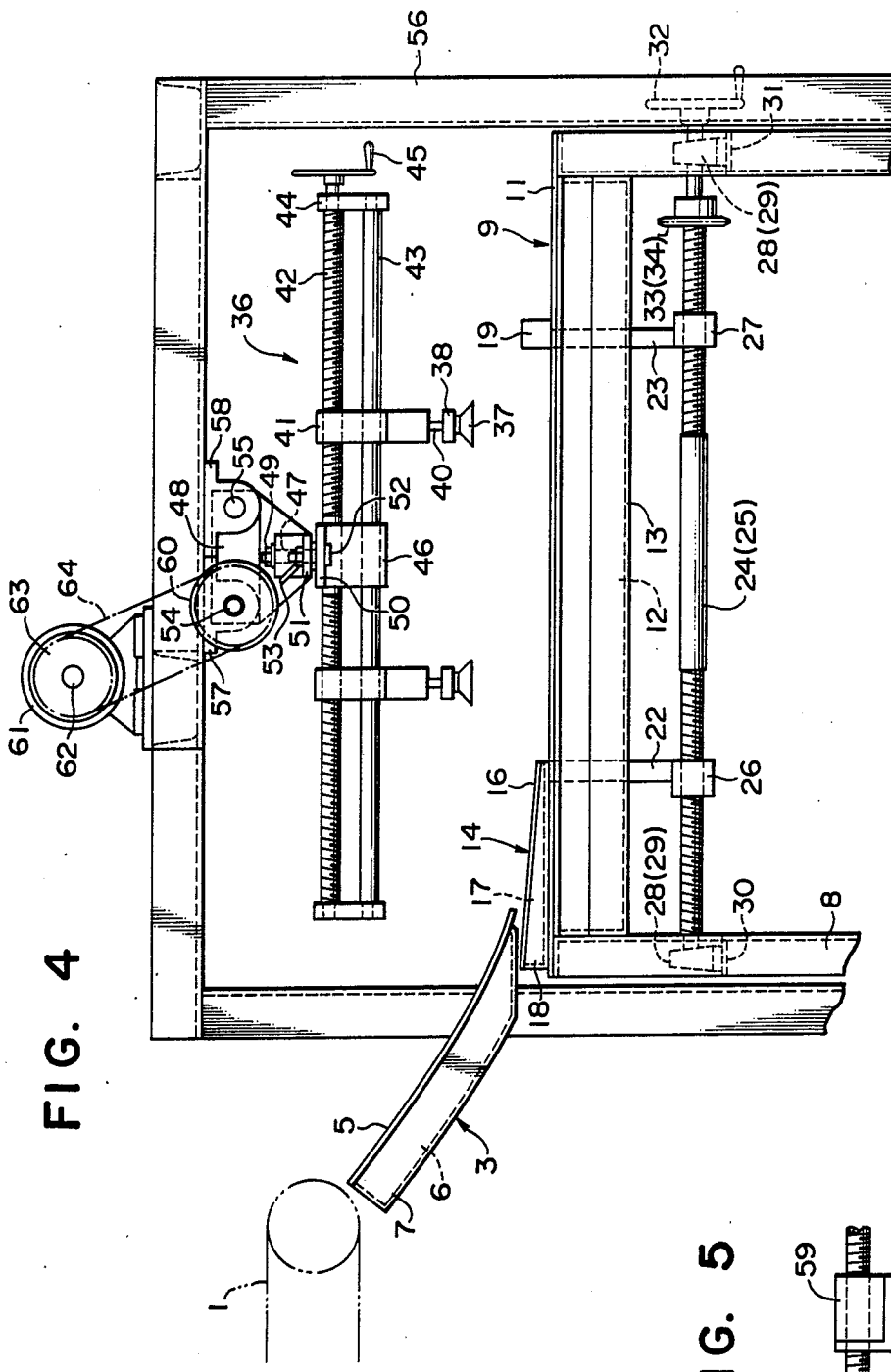
FIG. 4 is a side view as seen from the line A—A in FIG. 2.
Figure 5:
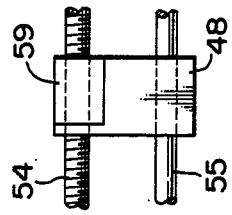
FIG. 5 is a plan view as seen from the line B—B in FIG. 3.

A transfer mechanism generally designated at 36 is provided for suckingly holding and transferring the cord fabric conveyed onto the air ejecting table 9 and will be described in greater detail hereinafter with reference to FIGS. 3 to 5. A pair of vaccum cups 37 are respectively attached to brackets 38 to suck and hold the cord fabric. An air cylinder 39 have a piston rod 40 the forward end of which is securely connected to the bracket 38. The air cylinder 39 is securely mounted on each of brackets 41 which are held on an oppositely threaded rod 42 and a guide rod 43 the both ends of which are rotatably supported on a pair of supporting plates 44. A handle 45 is attached to the end of the threaded rod 42 and serves to move the vaccum cups 37 toward and away from each other upon rotation thereof. A bracket 46 is adapted to support the longitudinally intermediate portions of the threaded rod 42 and the guide rod 43 and has a shaft 47 at the upper end portion thereof. The shaft 47 is rotatably supported at the lower portion of a bracket 48 and pivotally connects the brackets 46 and 48 together with a nut 49. The brackets 46 and 48 have respective projections 50 and 51 which are clamped by means of a bolt 52 and a nut 53, which makes it possible to adjust the angular positions of the vacuum cups 37 in accordance with the angle of the bias-severed cord fabric. A screw shaft 54 and a guide rod 55 are disposed in a conveyance direction of the cord fabric and are spaced in parallel to each other, while having the both ends rotatably supported by bearings 57 and 58, respectively, securely mounted on a frame 56. An internal thread 59 engaged with the screw shaft 54 is attached to the bracket 48 as particularly shown in FIG. 5. Referring to FIGS. 4 and 5, attached to the end of the screw shaft 54 is a sprocket wheel 60 which is in driving connection with a sprocket wheel 63, by means of an endless chain 64 passed thereover, which is securely mounted on an output shaft 62 of a reversible electric motor 61 so that the vaccum cups 37 are movable in a conveyance direction of the cord fabric upon rotation of the electric motor 61 through the screw shaft 54 and the guide rod 55. Referring again to FIG. 2, a light projector 65 and a light receiver 66 are provided forwardly of the transfer mechanism 36 for detection of the leading end of the severed cord fabric transferred by the vaccum cups 37 to produce a signal for stopping rotation of the electric motor 61 when the light projected from the light projector 65 is interrupted by the leading end of the cord fabric.

A conveyor mechanism generally designated at 67 is provided for suckingly holding and conveying the cord fabric transferred by the transfer mechanism 36 and will be described hereinafter in greater detail with reference to FIGS. 1 to 3 and 6 to 7. There is shown a conveyor frame 68 whose upper portion has a belt guide plate 70 formed with twelve belt guide grooves 69 extending along the conveyance direction of the cord fabric. Twelve rubber belts 71 are received in the respective belt guide grooves 69 and each of the rubber belts 71 has a number of air nozzles 72 formed at a constant pitch in a longitudinal direction thereof. Each of the grooves 69 of the belt guide plate 70 is formed with a longitudinal slit, not shown, which is pneumatically communicated with the air nozzles 72 and connected with each of air pipes 73 welded to the underside of the belt guide plate 70. The air pipes 73 are each adapted to be vaccumed at the backward portion, i.e., left half thereof in FIG. 1, while the forward portions, i.e., right halves of the air pipes 73 are alternatively supplied with compressed air and vaccumed. Guide rollers 74, 75, 76 and 77 are rotatably supported at their both ends by bearings 78, 79, 80 and 81, respectively, to guide the rubber belts 71. A tension adjusting mechanism 82 is provided below the conveyor frame 68 and has a tension roller 83 for tension adjustment of the rubber belts 71. A drive roller 84 is rotatably supported at its both ends by bearings 85 to rotate the rubber belts 71 and has at one end a sprocket wheel 86. A bracket 87 is attached to the side of the conveyor frame 68 and carries thereon an intermittently driven electric motor 88 whose output shaft 89 carries thereon a sprocket wheel 90 having a driving connection with a sprocket wheel 86 through an endless chain 91. Therefore, the electric motor 88, upon actuation, intermittently drives the rubber belts 71 through the sprocket wheels 90, 86 and the endless chain 91. An air ejecting box 92 with an air chamber 92a is provided in contact with the lower surfaces of the rubber belts 71 and has at its upper surface slits (not shown) opposing to the air nozzles 72 of the rubber belts 71. Compressed air is introduced into the air ejecting box 92 through an air duct, not shown, while being under necessity.

At the longitudinally intermediate portion of the conveyor mechanism 67 is provided a cord fabric splicing mechanism 93 which will be described hereinafter in greater detail with reference to FIGS. 6 to 11. A pair of vaccum boxes 94 connected to a vacuum source have a number of air nozzles (not shown) at the lower surface thereof and extend toward the both sides of the conveyor mechanism 67 from the center line thereof. Each of the vaccum boxes 94 has a milk-white transparent plate 95 horizontally extending from the rear end thereof as shown particularly in FIGS. 2, 6, 8 and 9. Guide rods 96 are vertically mounted on the vacuum boxes 96 to be slidably engaged with bores 101, 102, 103 and 104 of brackets 97, 98, 99 and 100. A square cross-sectioned supporting rod 105 has both ends secured to the brackets 97 and 98, respectively, while a square cross-sectioned supporting rod 106 is secured at its both ends to the brackets 99 and 100, respectively. The bracket 98 has at one end a groove 107 which is engaged with a projection 108 formed at one end of the brackets 99. A pivotal rod 109 pivotally connects the brackets 98 and 99 at their one ends. An air cylinder 110 is attached to the side of each of the brackets 97, 98, 99 and 100 and has a piston rod 110a the leading end of which is securely connected to the both end portions of each of the vaccum boxes 94 so that the air cylinders 110 are actuated to cause the vacuum boxes 94 to move upwardly and downwardly under guidance of the guide rods 96. Sliders 111 are held in sliding engagement with the supporting rods 105 and 106, respectively, and each of the slider 111 has an upstanding shaft 112. A bracket 114 slidably engaged with a guide rod 113 (see FIG. 6) is pivotally coupled with each of the sliders 111 by means of the upstanding shaft 112 and a nut 115. A pair of brackets 116 holds the both ends of the guide rod 113 with nuts 117 and has upper ends rigidly connected to the lower surface of each of slide plates 118. A pulse motor 119 is supported by a bracket 120 vertically depending from the slide plate 118 and has an output shaft 121 which is connected through a coupling 122 to a screw shaft 123 having both ends rotatably supported by the brackets 116. A screw unit 124 attached to the bracket 114 is held in threaded engagement with the screw shaft 123. Simultaneous rotation of the pulse motors 119 causes the vaccum boxes 94 to simultaneously move along the running direction of the rubber belts 71 through the screw shafts 123, the screw units 124 and the brackets 114 and the supporting rods 105 and 106. On each of the slide plates 118 is formed a projection 125 which is in threaded engagement with each of screw shafts 126 which are disposed at a predetermined angle relative to the running direction of the rubber belts 71. Each of the screw shafts 126 has both ends rotatably supported by bearings 127 securely mounted on a concave portion of a bracket 128. Simultaneous rotation of the screw shafts 126 causes the vaccum boxes 94 to simultaneously rotate around the pivotal rod 109 through the slide plates 118, the brackets 116 and 114, the sliders 111 and the supporting rods 105 and 106. It is thus possible to bring the vaccum boxes 94 into alignment with the oblique edge of the cord fabric as shown in phantom lines in FIG. 9. A sprocket wheel 130 is securely mounted on one end of the screw shaft 126 and has a driving connection with one of double sprocket wheels 131 through an endless chain 140. The double sprocket wheels 131 are securely mounted on a shaft 132 which is rotatably carried on a bracket 134 attached onto the upper portion of a frame 133. A plate 135 is securely mounted on the upper surface of the frame 133 and carries thereon a pair of bearings 136 which rotatably support a rotary shaft 137. On one end of the rotary shaft 137 is securely mounted a sprocket wheel 138 which is in driving connection with the other of the double sprocket wheels 131 through an endless chain 139. A handle 141 is carried on the other end of the rotary shaft 137. Rotation of the handle 141 causes the screw shaft 126 to rotate through the rotary shaft 137, the sprocket wheel 138, the endless chain 139, the double sprocket wheels 131, the endless chain 140 and the sprocket wheel 130. An air cylinder 142 has a piston rod 144 the leading end of which is connected to each of the slide plates 118 and is movable in a slot 143 formed at the bottom of each of the brackets 128. Thus, it is possible to clamp the slide plates 118 to brackets 128 as the air cylinders 142 are actuated to cause the piston rods 144 to retract, forcing the lower surfaces of the air cylinders 142 to be urged against the bottoms of the brackets 128. When the slide plates 118 are moved away from the brackets 128, the air cylinders 142 are again actuated to cause the piston rods 144 to project. An elongate opening 145 is formed in the bottom of the bracket 128 for slidably receiving the projection 125 on the slide plate 118. A pair of spaced parallel projections 146 are welded to the lower surface of each of the brackets 128 to retain and guide the slide plate 118. Brackets 147 are attached to the lower surfaces of the upper beams 148 and 149 of the frame 133 to slidably receive respective brackets 150 attached to the both ends of the bracket 128. An air cylinder 151 has a piston rod 152 the leading end of which is connected to each of the brackets 150 and is inserted through a slot formed at the bottom of each of the upper beams 148 and 149. The brackets 150 may be clamped to the upper beams 148 and 149 as the air cylinders 151 are actuated to cause the piston rods 152 to retract, forcing the lower surfaces of the air cylinders 151 to be urged against the bottoms of the upper beams 148 and 149. A bracket 153 is slidably supported by a guide rod 155 and connected to a supporting shaft 109 through a nut 154 as particularly shown in FIG. 8. The both ends of the guide rod 155 is carried by a pair of brackets 156 and clamped by nuts 157. A pulse motor 159 is supported by a bracket 158 vertically depending from a base plate 164 and has an output shaft 160 which is connected through a coupling 161 to a screw shaft 162 having both ends rotatably supported by the bracket 156. A horizontal bracket 163 supports the brackets 156 and the bracket 158 through the base plate 164 and is rigidly connected at its both ends to brackets 165 fixed to the lower surfaces of the beams 148 and 149 at a position between the brackets 150. A pair of oppositely threaded screw shafts 166 and 167 are rotatably supported at both ends in parallel relation to each other by bearings 168 on the frame 133 below the cross beams 148 and 149 and have non-threaded central portions engaged with the brackets 165 and oppositely threaded side portions held in threaded engagement with the brackets 150. A handle 169 is carried on one end of the screw shaft 166, and sprocket wheels 170, only one of which is shown, are carried on one end portion of the screw shafts 166 and 167, while having a driving connection with each other through an endless chain (not shown) passed thereover. When the handle 169 is rotated, the brackets 150 are moved toward and away from each other while being guided by the brackets 147 to cause the brackets 114 to move toward and away from each other widthwise of the running direction of the cord fabric.

Figure 9:
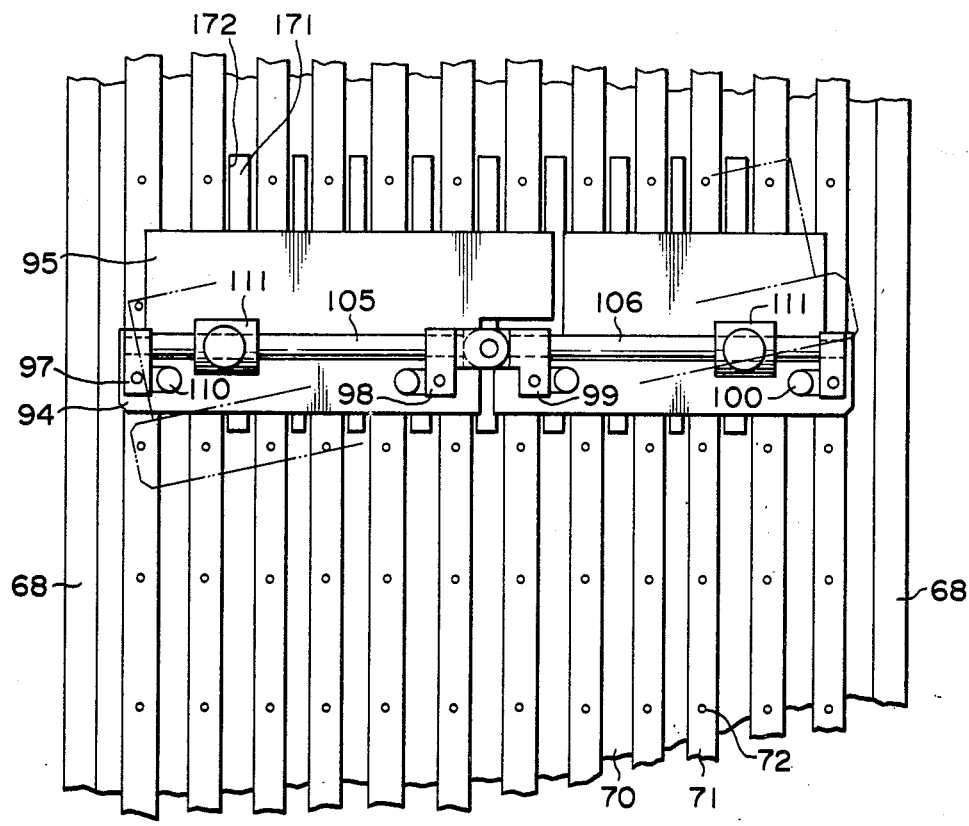
FIG. 9 is a plan view as seen from the line E—E in FIG. 7.

As shown particularly in FIG. 9, a predetermined number of transparent plates 171 are each received in a groove 172 formed in the belt guide plate 70 between the belt guide grooves 69. On the brackets 114 and the bracket 153 are mounted respective light projectors 173 each of which projects a light downwardly as shown particularly in FIGS. 6 and 8. Three light receivers 174 are provided opposingly to the respective light projectors 173 so as to receive lights from the light projectors 173 through the milk-white transparent plates 95 and the transparent plates 171.

Figure 10:
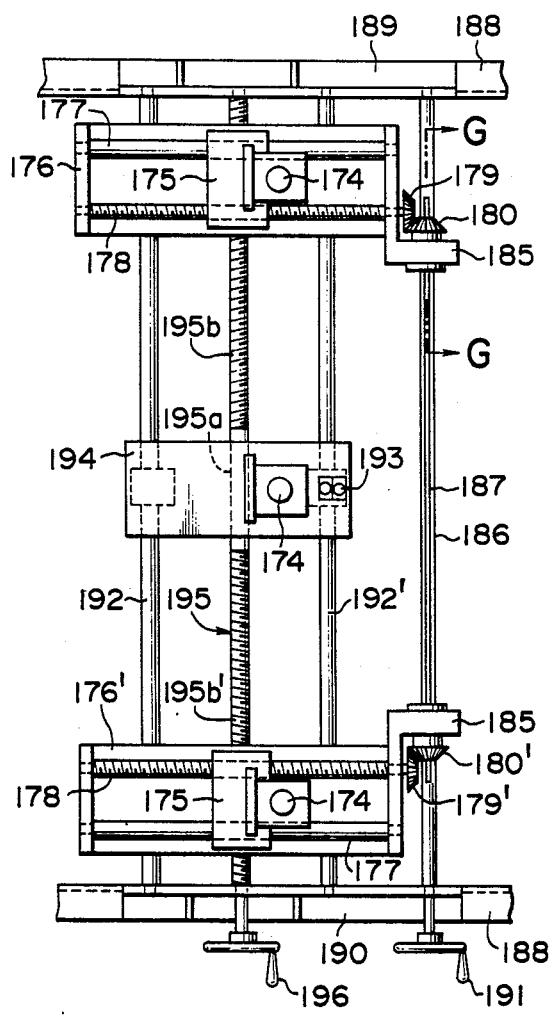
FIG. 10 is a plan view as seen from the line F—F in FIG. 6.
Figure 11:
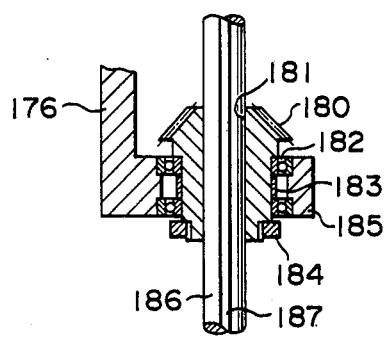
FIG. 11 is an enlarged cross-sectional view taken along the line G—G in FIG. 10.

As shown in FIG. 10, a pair of supporting members 189 and 190 are securely mounted on intermediate beams 188 of the conveyor frame 68 and are adapted to rotatably support both ends of a screw shaft 195 which has a central non-threaded portion 195a on the longitudinally intermediate portion thereof and a pair of oppositely threaded portions 195b and 195b' formed toward the both ends thereof from the central non-threaded portion 195a. A pair of parallel spaced guide rods 192 and 192' are also securely mounted on the supporting members 189 and 190 in parallel to the screw shaft 195. On the oppositely threaded portions 195b and 195b' are drivably engaged with movable brackets 176 and 176', respectively, which are in sliding engagement with the guide rods 192 and 192'. A handle 196 is securely mounted on one end of the screw shaft 195 so as to rotate the screw shaft 195. Each of the movable brackets 176 and 176' rotatably supports a screw shaft 178 at both ends substantially in right angles with respect to the screw shaft 195 and the guide rods 192 and 192'. Each of the movable brackets 176 and 176' also fixedly supports a guide rod 177 in parallel relation with the screw shaft 178. A light receiver 174 is mounted on a movable bracket 175 which is drivably engaged with each of the screw shafts 178 while being in sliding engagement with each of the guide rods 177. The movable brackets 176 and 176' are formed with projections 185 and 185' which rotatably carry bevel gears 180 and 180', respectively, through respective bearings 182. The bearings 182 interpose a collar 183 and are held by a lock nut 184 as shown particularly in FIG. 11. A rotary shaft 186 has both ends rotatably supported by the supporting members 189 and 190 and is adapted to be inserted through a bore 181 formed in each of the bevel gears 180 and 180'. The rotary shaft 186 and the bevel gears 180 and 180' are coupled to each other by means of an elongate key extending throughout and received by the rotary shaft 186. The bevel gears 180 and 180' are meshed with bevel gears 179 and 179' which are securely mounted on one ends of the screw shafts 178. On the cental non-threaded portion 195a of the screw shaft 195 and on the central portions of the guide rods 192 and 192' is securely mounted a stationary bracket 194 on which a light receiver 174 and a reflection type photoelectric tube 193 are mounted. The movable brackets 176 and 176' are thus caused to move toward and away from the stationary bracket 194 along the guide rods 192 and 192' through the screw shaft 195 by rotation of the handle 196 so that the light receivers 174 are moved toward and away from the central light receivers 174 and the photoelectric tube 193. Likewise, the movable brackets 175 are thus caused to move substantially in right angles with respect to the movement of the movable brackets 176 and 176' along the guide rods 177 through the rotary shaft 186 and the bevel gears 180, 180', 179 and 179' by rotation of the handle 191 so that the light receivers 174 are moved substantially in right angles with respect to the guide rods 192, 192' and the screw shaft 195 and in opposite directions to each other. It is thus possible to arrange three light receivers 174 opposingly to the corresponding light projectors 173.

As shown particularly in FIG. 2, light projector 197 and a light receiver 198 are located above and under a position between rubber belts 71 where a light passing bore (not shown) is formed in the belt guide plate 70 so that when the forward end of the severed cord fabric reaches the bore to cause the light projected from the light projector 197 to be prevented from being received by the light receiver 198, the light receiver 198 produces a signal to cause the electric motor 88 to decrease the number of rotation thereof, decreasing a running speed of the rubber belts 71.

As shown particularly in FIG. 1 and 2, a pressing roller 199 is disposed forwardly of the splicing mechanism 93 and above the belt guide plate 70 to extend throughout the width of the belt guide plate 70. The pressing roller 199 has at both ends rotary shafts 200 and 200' which are rotatably supported on brackets 201 secured to the forward ends of piston rods 204 of air cylinders 202, respectively, one of which is only shown in the drawings. At the both forward side ends of the frames 133 are attached brackets 203 and 203' onto which the air cylinders 202 are vertically fixed. The air cylinders 202 are thus simultaneously actuated to cause the pressing roller 199 to project downwardly so that the splicing and overlapped portions of the cord fabrics are brought into a pressed condition by the pressing roller 199 and the rubber belts 71 on the belt guide plate 70.

The splicing operation in the apparatus thus constructed and arranged will now be described with reference to FIGS. 1 to 12.

Figure 6:
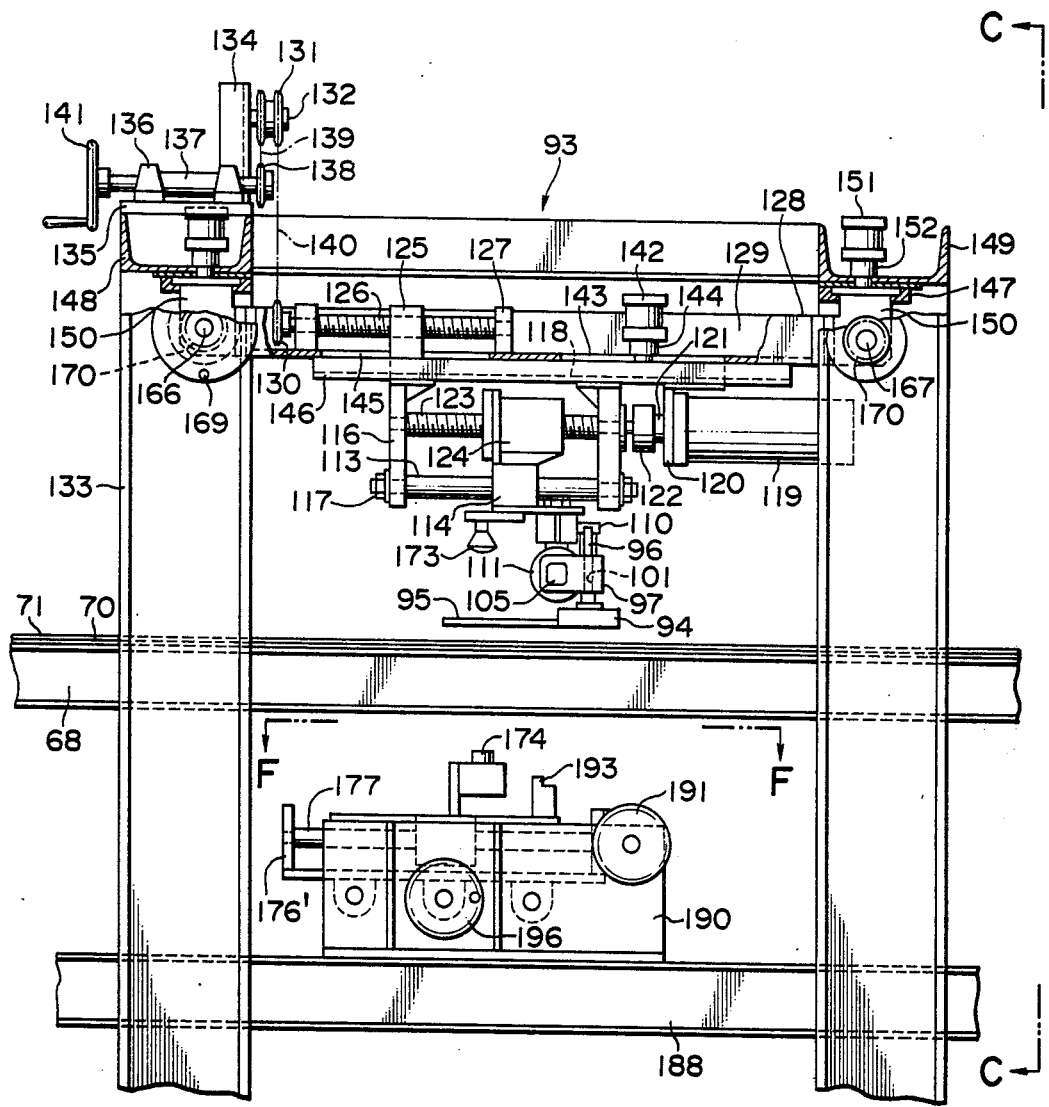
FIG. 6 is an enlarged front view, partly in section, of a splicing mechanism of the apparatus illustrated in FIGS. 1 and 2.
Figure 7:
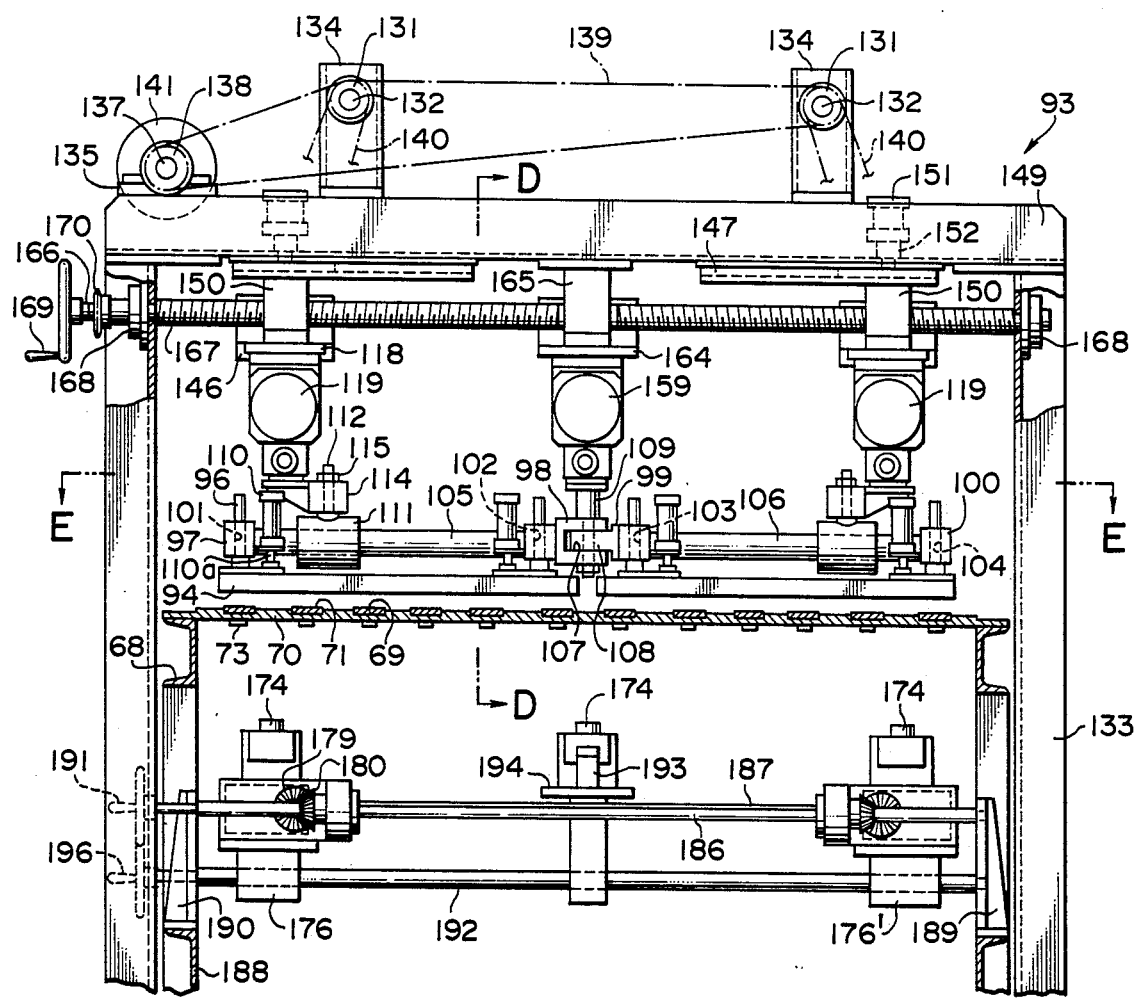
FIG. 7 is a side view, partly in section, as seen from the line C—C in FIG. 6.
Figure 8:
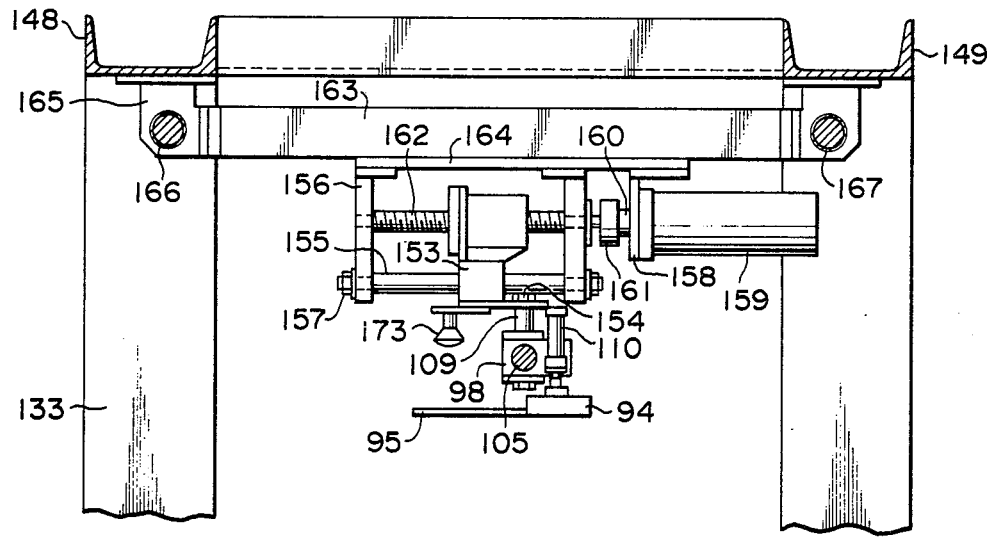
FIG. 8 is a front view, partly in section, as seen from the line D—D in FIG. 7.

Before starting the apparatus, the oblique angle of the cord fabric to be severed by the bias-cutter 2 is firstly determined. In FIG. 4, the handle 32 is then rotated to nearly coincide the space between the stop member 19 and the air ejecting chute 14 with the width of cord fabric. The nut 53 is then loosened to adjust the angular positions of the vaccum cups 37 which are thereafter moved to oppose the side portions of the cord fabric by rotating the handle 45. In FIG. 6, the handle 141 is then rotated to angularly adjust the vaccum boxes 94 and the handle 169 in FIG. 7 is then rotated to move the outside light projectors 173 to positions immediately above the side portions of the cord fabric. In FIG. 10, the handles 191 and 196 are rotated to bring the outside light receivers 174 into opposing positions to the outside light projectors 173. Upon completion of such adjustment operations, the splicing operation can be started for the severed cord fabrics.

Figure 12:
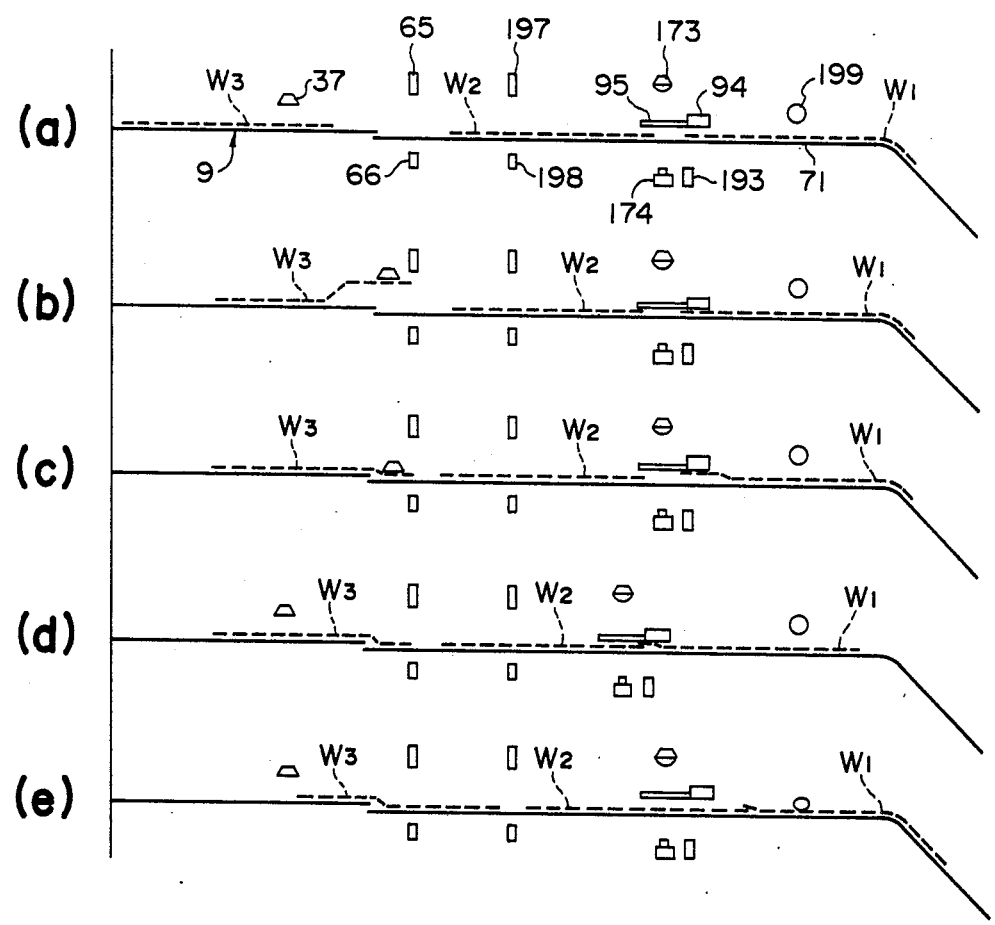
FIGS. 12a to 12e are explanatory views showing the steps of the splicing operation.

The bias-cutter conveyor 1 is firstly driven and compressed air is then supplied to the air ejecting chutes 3, 14 and the air ejecting table 9 from a suitable compressed air source. All the air pipes 173 are then vaccumed throughout the forward and rear portions thereof to suck exterior air through the air nozzles 72 formed in the rubber belts 71 of the conveyor mechanism 67. The continuous cord fabric is then intermittently fed to the bias-cutter 2 to start the cutting operation. In FIG. 12, a first cord fabric $w1$ severed by the bias-cutter 2 is conveyed by the bias-cutter conveyor 1 to the air ejecting table 9, during which the first cord fabric $w1$ slides down on the air ejecting chutes 3 and 14 in a floating state and the leading end of the first cord fabric $w1$ is brought into contact with the stop member 19 while the trailing end thereof comes to be in contact with the forward face of the air ejecting chute 14. The first cord fabric $w1$ is thus caused to stop at a predetermined position on the air ejecting table 9 in a floating condition. When the first cord fabric $w1$ assumes such a position on the air ejecting table 9, the air cylinders 39 of the transfer mechanism 36 are simultaneously actuated to cause the piston rods 40 to project downwardly so that the vacuum cups 37 are lowered and suckingly hold the first cord fabric $w1$. The air cylinders 39 are then simultaneously actuated to cause the piston rod 40 to retract upwardly so that the vaccum cups 37 are moved upwardly while holding the first cord fabric $w1$. Thereafter, the electric motor 61 is driven to move the vaccum cups 37 toward the conveyor mechanism 67. When the leading end of the first cord fabric $w1$ intercepts a light from the light projector 65, the electric motor 61 is stopped and the air cylinders 39 are again actuated to lower the vaccum cups 37. The first cord fabric $w1$ is then released from the vaccum cups 37 and suckingly held by the rubber belts 71 which are under vaccum. The electric motor 88 shown in FIG. 1 is then driven to convey the first fabric cord w1 forwardly and reaches a position immediately below the light projector 197 shown in FIG. 2, whereupon a light from the light projector 197 is intercepted by the leading end of the fabric cord w1 to decrease a conveyance speed of the first cord fabric w1. When the leading end of the first cord fabric w1 is then advanced to a predetermined position on the conveyor mechanism 67, rotation of the electric motor 88 is stopped. A second cord fabric w2 severed by the bias-cutter 2 is then transferred onto the conveyor mechanism 67 with a predetermined space to the previously advanced first cord fabric w1 by the transfer mechanism 36 in a similar manner. The electric motor 88 is again rotated so that the first and second cord fabrics w1 and w2 are simultaneously advanced by the conveyor mechanism 67. When the leading end of the second cord fabric w2 intercepts a light from the light projector 197, the conveyance speed of the cord fabrics w1 and w2 is decreased in a similar fashion. The electric motor 88 is then stopped to cause the rubber belts 71 to be stopped when the reflection type photoelectric tube 193 detects the trailing end of the first cord fabric w1. The above condition is diagrammatically shown in FIg. 12a. The vaccum boxes 94 are then lowered by the simultaneous actuation of the air cylinders 110 to suck the trailing end of the cord fabric w1, whereupon the leading end of the second cord fabric w2 is compressed by the milk-white transparent plate 95 as shown in FIG. 12b. On the other hand, a third cord fabric w3 is suckingly held by the vaccum cups 37 of the transfer mechanism 36. When the light projectors 173 then projects respective lights, the light receivers 174 receive the lights projected through spaces between the opposing central and outside edges of the trailing ends of the first cord fabric and the leading end of the second cord fabric w2. The amount of each of the lights received by the light receivers 174 is transformed into the amount of distance. The amount of distance is then added to the overlapping length of the cord fabrics w1 and w2 and their total value is then transformed into an electric pulse signal. The air cylinders 110 are simultaneously actuated to cause the piston rods 110a to retract upwardly so that the vaccum boxes 94 are lifted while suckingly holding the trailing end of the first cord fabric w1 as shown in FIG. 12c. At the same time, the forward portions of the air pipes 73 of the conveyor mechanism 67 are supplied with compressed air which is thus ejected from the air nozzles 72 to force the first cord fabric w1 forwardly. The electric pulse signal is then transmitted to the pulse motors 119 and 159 to move the vaccum boxes 94 to the leading end of the second cord fabric w2 so that the trailing end of the first cord fabric w1 assumes a position immediately above the leading end of the second cord fabric w2. The air cylinders 110 are then simultaneously actuated to cause the piston rods 11a to project downwardly so that the trailing end of the first cord fabric w1 is overlapped and spliced on the leading end of the second cord fabric w2 as shown in FIG. 12d. Upon completion of such a splicing operation, the air cylinders 110 and the electric pulse motors 119 and 159 are actuated to reassume the vaccum boxes 94 to their initial positions. On the other hand, the rubber belts 71 are then driven by the electric motor 88 to forwardly convey the first, second and third cord fabrics w1, w2 and w3. When the spliced portions of the first and second cord fabrics w1 and w2 are advanced to a position immediately below the pressing roller 199, the air cylinders 202 are simultaneously actuated to cause the piston rods 204 to project downwardly so that the pressing roller 189 is pressed against the spliced portions on the rubber belts 71 of the belt guide plate 70 as shown in FIG. 12e. The spliced cord fabrics w1 and w2 are then wound by a winding machine to form a winding w as shown in FIGS. 1 and 2.

A single and complete cycle of the splicing operation in the apparatus embodying the present invention has been described. Such a splicing operation will be repeated to produce a continuous bias-cut cord fabric.

As mentioned above, the apparatus according to the present invention does not need any manual operation and brings about uniform splicing of the cord fabric without any tension thereto, resulting in excellent performance to a finished tire. The apparatus of the present invention may be applied to other splicing operations such as for a sheet material.

While a particular embodiment of the present invention have been shown and described, it will be obvious to those skilled in the art that various modifications and changes may be made without departing from the present invention.

What is claimed is:

1. An apparatus for splicing rubber coated cord fabric sections in which a continuous rubber coated parallel cord fabric strip having side edges is obliquely severed into rhomboidal cord fabric sections and said side edges are thereafter overlapped and spliced in regular succession into a continuous bias cord fabric strip, comprising:
   a bias-cutter conveyor including a conveyor for transferring said continuous cord fabric and a bias-cutter mounted on said conveyor for obliquely severing said cord fabric strip into rhomboidal cord fabric sections;
   a positioning mechanism for positioning each of said severed cord fabric sections to have obliquely severed edges orientated to a conveyance direction thereof with said side edges obliquely arranged to said conveyance direction thereof;
   a transfer mechanism positioned forwardly of said positioning mechanism for suckingly holding and intermittently transferring each of said cord fabric sections;
   a conveyor mechanism positioned forwardly of said transfer mechanism and including a plurality of endless belts running along the conveyance direction of said cord fabric with a predetermined space therebetween and having a number of air nozzles formed in a longitudinal direction thereof, a belt guide plate positioned inwardly of said endless belts and having a plurality of grooves each receiving and guiding said endless belt, a plurality of air pipes each pneumatically communicating with said grooves through a longitudinal slit formed at the bottom of each of said grooves, each of said air pipes having a rear portion rearwardly of the splicing mechanism with respect to the conveyance direction of said cord fabric section to be vacuumed and a remaining portion to be vacuumed and supplied with compressed air, and drive means for intermittently running said endless belts, whereby said cord fabric sections received from said transfer mechanism are transferred; and
   a splicing mechanism positioned above the longitudinally intermediate portion of said conveyor mechanism for pulling back a previously advanced cord fabric section to overlap and splice the trailing edge of said previously advanced cord fabric section on the leading edge of a subsequently advanced cord fabric section.

2. An apparatus as set forth in claim 1, wherein said splicing mechanism includes a first movable bracket mounted on a frame structure at a position above the center of said belt guide plate to be movable along the conveyance direction of said cord fabric section, a first drive source mounted on said frame structure for reciprocally moving said first movable bracket, a pair of second movable brackets mounted on said frame structure at a position above the sides of said belt guide plate and in spaced relation with said first movable bracket to be movable along the conveyance direction of said cord fabric section, a pair of second drive sources mounted on said frame structure for reciprocally moving said second movable brackets, respectively, a pair of supporting rods having opposite inner ends pivotally connected by a pivotal rod and jointly extending throughout the width of said belt guide plate, each of said supporting rods being held in sliding engagement with a slider pivotally connected to each of said second movable brackets, a pair of vacuum boxes each having both ends slidably engaged with both ends of each of said supporting rods to be movable toward and away from said belt guide plate, each of said guide vacuum boxes having a lower plate formed with a number of air nozzles to suck exterior air, two pairs of actuators, each pair of said actuators being securely mounted on both ends of each of said supporting rods and having leading ends fixedly connected to said vacuum box, and a detection arrangement which includes a first light projector mounted on the rear end of said first movable bracket to project a light toward the center of said belt guide plate, a pair of second light projectors mounted on the respective rear ends of said second movable brackets to project respective lights toward the sides of said belt guide plate, a first light receiver provided under said belt guide plate to receive the light projected from said first light projector through elongate slits formed between said belt guide grooves in said belt guide plate, and a pair of second light receivers provided under said belt guide plate to receive the lights projected from said second light projectors through elongate slits formed between said belt guide grooves in said belt guide plate, whereby said light projectors and receivers of said detection arrangement detect central and side spaces between the trailing edge of a previously advanced cord fabric section and the leading edge of a subsequently advanced cord fabric section so that said first and second brackets are caused to move in a direction opposite to the conveyance direction of said cord fabric section for pulling back and overlapping said previously advanced cord fabric section onto said subsequently advanced cord fabric section at ratios corresponding to said central and side spaces while said trailing edge of said previously advanced cord fabric section is being held by said vacuum boxes toward said belt guide plate, forcing the overlapped portions of said cord fabric sections to be spliced together by said vacuum boxes.

3. An apparatus as set forth in claim 1, wherein said splicing mechanism includes a first bracket support mounted on a frame structure at a position above the center of said belt guide plate, a first movable bracket mounted on said first bracket support to be movable along the conveyance direction of said cord fabric section, a first drive source mounted on said first bracket support for reciprocally moving said first movable bracket, a pair of second bracket supports mounted on a frame structure at positions above the sides of said belt guide plate to be movable substantially at right angles relative to the conveyance direction of said cord fabric section for space adjustment between said first and second bracket supports, a pair of second drive sources each mounted on said second bracket supports for reciprocally moving said second movable bracket, a pair of supporting rods having opposite inner ends pivotally connecting by a pivotal rod mounted on said first bracket and jointly extending throughout the width of said belt guide plate, each of said supporting rods being held in sliding engagement with a slide pivotally connected to each of said second movable brackets, a pair of vacuum boxes each having both ends slidably engaged with both ends of each of said supporting rods to be movable toward and away from said belt guide plate, each of said vacuum boxes having a lower plate formed with a number of air nozzles to suck exterior air, two pairs of actuators each pair securely mounted on both ends of each of said supporting rods and having leading ends fixedly connected to said vacuum box, and a detection arrangement which includes a first light projector mounted on the rear end of said first movable bracket to project a light toward the the center of said guide plate, a pair of second light projectors mounted on the respective ends of said second movable brackets to project respective lights toward the sides of said belt guide plate, a first light receiver provided under said belt guide plate to receive the light projected from said first light projector through slits formed between said belt guide grooves in said grooves in said belt guide plate, and a pair of second light receivers provided under said belt guide plate to be opposingly movable for reception of the light projected from said second light projectors through elongate slits formed between said belt guide grooves in said belt guide plate, whereby said light projectors and receivers of said detection arrangement detect central and side spaces between the trailing edge of a previously advanced cord fabric section and the leading edge of a subsequently advanced cord fabric section so that said first and second brackets are caused to move in a direction opposite to the conveyance direction of said cord fabric section for pulling back and overlapping said previously advanced cord fabric section onto said subsequently advanced cord fabric section at ratios corresponding to said central and side spaces while said trailing edge of said previously advanced cord fabric section is being held by said vacuum boxes, and thereafter to cause the actuators to move said vacuum boxes toward said belt guide plate, forcing the overlapped portions of said cord fabric sections to be spliced together by said vacuum boxes, and whereby said second light projectors and receiver are adjustably moved toward and away from each other and angularly arranged correspondingly to the size and the oblique angle of the cord fabric section and the oblique angle of the vacuum boxes are adjustable in alignment with the oblique angle of the cord fabric section.

4. An apparatus as set forth in claim 3, wherein said second bracket supports are each in threaded engagement with a screw shaft rotatably mounted on said frame structure and having a driving connection with drive means for rotation thereof.

5. An apparatus as set forth in claim 1, wherein said positioning mechanism includes a stationary air chamber located below and in the vicinity of said bias-cutter conveyor and having an upper plate formed with a number of air nozzles, a movable compressed air chamber slidably movable substantially at right angles with respect to the conveyance direction of said cord fabric section on one side of said stationary air chamber opposite to said conveyor of said bias-cutter conveyor and having a slanted upper plate formed with a number of air nozzles, and a stop member movable toward and away from the movable compressed air chamber, whereby said movable compressed air chamber and said stop member are moved toward each other for adjustment in space therebetween to position said severed cord fabric section conveyed from said bias-cutter conveyor over said movable compressed air chamber while compressed air is being ejected from said air nozzles of said stationary and movable compressed air chamber to float said cord fabric section.

6. An apparatus as set forth in claim 5, which further includes a slanted chute provided between said bias-cutter conveyor and said movable compressed air chamber and having an upper plate formed with a number of air nozzles, whereby compressed air is ejected from said air nozzles to float said cord fabric section while said cord fabric section is being transferred from said bias-cutter conveyor onto said stationary compressed air chamber over said slanted chute.

7. An apparatus as set forth in claim 5, wherein said movable compressed air chamber and said stop member are in threaded engagement with oppositely threaded portions, respectively, of at least a screw shaft rotatably mounted on a frame structure, said screw shaft being securely connected to a handle.

* * * * *